(12) United States Patent
Lueng et al.

(10) Patent No.: US 7,483,693 B2
(45) Date of Patent: Jan. 27, 2009

(54) APPARATUS AND METHOD FOR CONTEXT-SENSITIVE DYNAMIC INFORMATION SERVICE COMPOSITION VIA MOBILE AND WIRELESS NETWORK COMMUNICATION

(75) Inventors: Kelvin T. Lueng, Los Angeles, CA (US); Son Dao, Northridge, CA (US); Eddie Shek, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1430 days.

(21) Appl. No.: 09/921,296

(22) Filed: Aug. 2, 2001

(65) Prior Publication Data

US 2002/0061741 A1 May 23, 2002

Related U.S. Application Data

(60) Provisional application No. 60/222,579, filed on Aug. 1, 2000.

(51) Int. Cl.
*H04M 1/68* (2006.01)

(52) U.S. Cl. .............. 455/414.1; 455/457; 455/517; 455/422.1; 455/404.2; 455/412.2; 455/456.1; 455/456.4; 455/408; 455/410

(58) Field of Classification Search ............. 455/414.1, 455/456.1, 456.4, 458, 461, 440, 425, 414, 455/550

See application file for complete search history.

(56) References Cited

U.S. PATENT DOCUMENTS

| | | | |
|---|---|---|---|
| 6,259,990 B1 * | 7/2001 | Shojima et al. | 701/209 |
| 6,424,888 B1 * | 7/2002 | Sone et al. | 701/1 |
| 6,647,257 B2 * | 11/2003 | Owensby | 455/414.1 |

FOREIGN PATENT DOCUMENTS

| | | |
|---|---|---|
| GB | 2356321 | 5/2001 |
| WO | 9741654 | 11/1997 |
| WO | 0022860 | 4/2000 |
| WO | 0186547 | 11/2001 |
| WO | 0207050 | 1/2002 |

* cited by examiner

*Primary Examiner*—Charles N Appiah
*Assistant Examiner*—Randy Peaches
(74) *Attorney, Agent, or Firm*—Cary Tope-McKay

(57) ABSTRACT

An Information Source 600 provides information to a Data Service element 602. A Directory Service Update Decision element 604 registers 606 with a Directory Service element 608. The client 610 provides a request to a Personal Lookup Agent element 612. The Directory Service Poll Decisions 614 queries the Directory Service element 608 with a Lookup 616 request. The Personal Lookup Agent 612 implements an interface to the Directory Service element 608 that allows the client 610 to ingest application-specific objects that encapsulates control functions for Directory Service Polling Decisions 614 for Candidate Service Filtering 618, and subsequent Target Service Filtering 620.

19 Claims, 9 Drawing Sheets

APPARATUS AND METHOD FOR CONTEXT-SENSITIVE DYNAMIC INFORMATION SERVICE COMPOSITION VIA MOBILE AND WIRELESS NETWORK COMMUNICATION

PRIORITY CLAIM

This application claims priority from U.S. Provisional application Ser. No. 60/222,579 filed Aug. 1, 2000 and entitled "Apparatus and Methods for Context-Sensitive Dynamic Information Service Composition Via Mobile Wireless Network Communication."

TECHNICAL FIELD

The present invention relates generally to a dynamic information service and more specifically to a context sensitive dynamic information service comprising mobile and wireless networks.

BACKGROUND

As data collection and dissemination technology continues to mature, there is an ever-widening chasm between data collection capabilities and data analysis and delivery capabilities. The result of ineffective data analysis is poor utilization of data resources and loss of opportunities to access useful data. For instance, a motorist, upon leaving work may want to know if the road home has ice on it. Alternatively, a motorist may desire information concerning traffic flow patterns along a specific stretch of roadway. Existing technology, available in many metropolitan areas, provides radio reports which include superficial data pertaining to traffic and generalized weather forecasts, Unfortunately, often the data provided is usually neither sufficiently detailed nor timely delivered. Part of this problem stems from the fact that there is simply too much data collected and too little time, and bandwidth, for complete dissemination, the result is poor utilization of data collection resources, and missed opportunities to provide data to potential users. Such missed opportunities, raise the price of data collection resources because fewer users must bear the costs associated with the data collection resources. Because of the nature of many types of situational-awareness data, the failure to provide timely delivery can mean that the data is essentially worthless, except for possible subsequent statistical evaluation.

Therefore it would be desirable to disseminate detailed data to users quickly, thereby allowing the users to consider the data and make better decisions, and lower the cost associated with data collection.

SUMMARY OF THE INVENTION

The problem, according to the present invention, with existing the data delivery structures is not too much data, but is rather a problem of data filtration and selective delivery. The present invention provides a method and apparatus for filtering data and categorizing it by contextual relevance. In this way the traditional "data-overload" bottleneck can be avoided. The invention includes three main classes of data, first is data that is of general interest or of particular interest, i.e. a user profile, this might include a notification that a vehicle is approaching a facility with restrooms or a fuel station. This data could be supplied such that when a fuel tank nears empty the invention would alert a driver what service stations exist in the next 20 miles and what their prices are for fuel. The second type of data is an alarm type. This type of data is location specific and notifies a user when the user is entering a situation that requires heightened awareness. Such a situation could be the presence of inclement weather, pathway obstructions, or other hazards. The third general class is similar to the second but is more along the lines of an anomaly-based notification. This system might warn a motor vehicle driver that the vehicle is entering a stretch of road without a service station for 200 miles and that the user's tank is approaching empty. The anomalies might include an unusual sensor reading such as an extremely fast temperature drop or the rapid slowing of vehicles in front of a users vehicle.

One embodiment of the present invention provides an apparatus that relates to context sensitive dynamic data disseminated via wireless networks. The primary components of the invention include, an information source element, which could be a video camera, a GPS, a thermometer, or virtually any other sensor that is likely to provide useful information to a client. The second element is comprised of a data service element, which generally includes a directory service update decision subelement and a client update decision subelement. These subelements, in essence serve as data sources for a directory service element and a personal lookup agent element respectively. The directory service element provides the initial matching services in response to a client's request, which is conveyed to the directory service element through the personal lookup agent element. The personal lookup agent element generally includes a directory service polling subelement, a candidate service-filtering subelement, and a target service filtrating subelement. In operation the information source provides data to the data service element, which registers with the directory service element. Next the client requests a service from the directory service utilizing a polling subelement that sends a lookup request to the directory service. The directory service element provides services generally matching those requested. The matching services are transmitted to the personal lookup agent element, where they are filtered to identify candidate services. The candidate services are then used as the basis for another filtering step, that isolates target services. The candidate services are also used as the basis for registering the client's interest with the client update decision subelement. Wherein the resulting isolated candidate services are submitted to a target service-filtering subelement; and wherein the isolated target services are provided to the client; and wherein the isolated candidate services serve as the basis for registering the client's interest with the client update decision subelement. For an interval of time thereafter, the client update decision subelement will use the registered interest as a basis for providing candidate services to the client.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Figure 1:
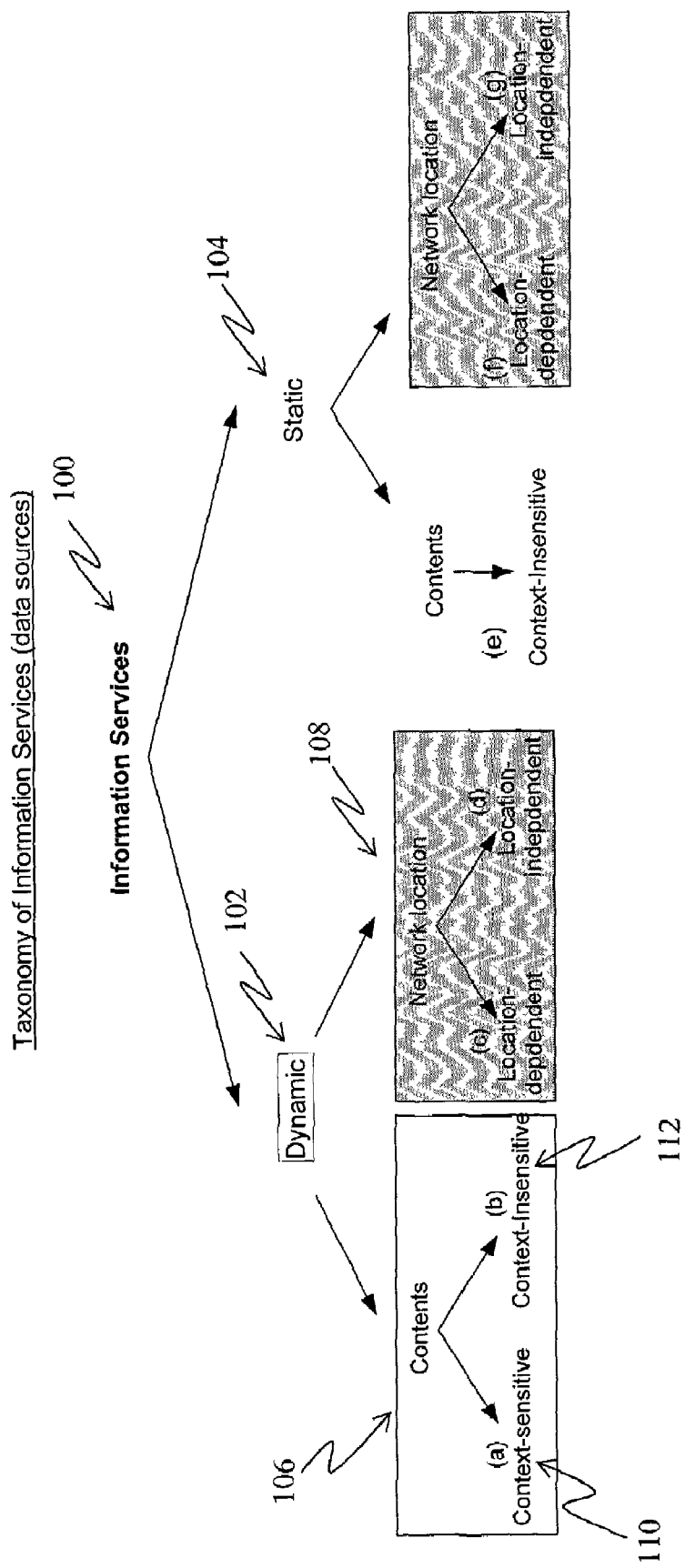
FIG. 1 is block diagram depicting the taxonomy of static and dynamic information services according to the present invention.

The present invention provides a method and apparatus for a context sensitive dynamic information service, based on a mobile wireless network. This embodiment of the invention includes a scalable, generic mobile service lookup communication and computing protocol. This protocol supports real-time composition of context-sensitive information and delivers multimedia contents from evolving mobile and proxy servers, to similarly evolving mobile clients. The following description, taken in conjunction with the referenced drawings, is presented to enable one of ordinary skill in the art to make and use the method and to incorporate it in the context of particular applications. Various modifications, as well as a variety of uses in different applications, will be readily apparent to those skilled in the art, and the general principles defined herein may be applied to a wide range of embodiments. Thus, the method of the present invention is not intended to be limited to the embodiments presented, but is to be accorded the widest scope consistent with the principles and novel features disclosed herein.

One embodiment of the present invention includes a lookup service platform, which utilizes a dynamic mobile service discovery middleware architecture and an adaptive service matching protocol (ASMP). This embodiment provides a generic soft-state service directory, containing descriptive, attribute-based dynamic information about the mobile resources that are utilized. The middleware architecture of the present invention implements a scalable generic mobile service lookup communication and computing design pattern. This middleware architecture allows both application logic, and update and filtering decisions, to be conveniently embedded in the generic communication and computation pattern for dynamic mobile service matching. The ASMP architecture is designed to support real-time composition of context-sensitive information service to deliver multimedia contents from evolving information sources to similarly evolving information sinks. The mobile servers and proxy servers, in the aggregate, serve as information sources, and the similarly evolving mobile clients serve as the information sinks. ASMP is based on resource discovery, coordination between information sources and information sinks, the source's and sink's respective service directories, and an event-based "smart-push" communication paradigm. This basis allows client applications to effectively locate and track a relatively small collection of evolving candidate information services, in the neighborhood that is best matched for similarly evolving clients. This approach is analogous to keeping index proxies or dynamic caches at hand for referencing to the candidate source information, rather than tracking all matching services. The dynamic mobile service lookup and matching can be demonstrated with an example of the vehicular video-based real-time traffic information service application. Here the ASMP provides better system scalability for dynamic mobile service composition as compared to a similarly constrained approach utilizing a conventional directory service (DS) architecture; constraints, as the term is used here, includes the level of accepted tolerance for inaccuracy in service location. The ASMP further provides a useful framework for creating and distributing new services dynamically, based on user needs and mobility management.

The ASMP supports dynamic mobile resources composition in a mobile computing environment, allowing user clients and agents to dynamically find, track, and bind appropriate information sources (mobile and proxy services) without constantly broadcasting requests to every user or device. Such a broadcast request is considered to be part of a control and coordination process in the dynamic service lookup and matching. For a given mobile information service, the frequency of the broadcast request can be dynamically adjusted to adapt to available bandwidth in the mobile network. Bandwidth availability can be measured utilizing a variety of bases including the number of concurrent users, and a client's interests as depicted in the client's profile. The ASMP allows client applications to dynamically compose new information services based on a user's context and interest. The new information services may be composed using a large set of evolving information services and proxy services available in the mobile services directory, where an existing data network architecture simply has no mechanism to support such a dynamic service composition. Additionally, the ASMP allows client applications to efficiently locate and track changing conditions. This location and tracking would allow for the location of a small collection of dynamically evolving candidate information services, in the neighborhood of a client, that may be its best match in the near future for similarly evolving clients. The ASMP also provides a scalable resource discovery, coordination, and communication mechanism to reduce the number of broadcast requests to users or devices, which are necessarily in the dynamic mobile service lookup and matching environment. Further, it allows client applications or information service providers to deploy new tracking strategies and services to optimize bandwidth use in the mobile network.

In a large-scale information system, it is increasingly important for mobile users to locate information that satisfies the mobile users' needs. It is also important to discover information services that dynamically produce and process information on the mobile users' behalf. Users' interests in information contents may change as their context and surroundings change. Many existing Internet Services Providers support connections from the core Internet to the user, and create a general-purpose service for end users. These services include email and chat rooms. These provided services do not adapt to users' profiles, bandwidth availability, or connectivity failures. In addition, existing data network architectures do not include mechanisms for creating and distributing new services dynamically. Due to the nature of mobile services or mobility of services, attributes such as GPS location of service can change dynamically and updating such dynamic attributes to the mobile service directory, can similarly increase proportionally. This can create a so-called "update" problem to a mobile service directory. At the same time, mobile clients would like to locate mobile information services as accurately as possible to satisfy their needs. As a result mobile clients would need to poll the service directory to locate the most appropriate mobile services to meet their needs. Thus, mobile clients would increase the workload of the mobile service directory. The problem of excessive polling of a mobile service directory is called a "polling problem". Excessive updating or polling can overload the mobile service directory and consequently, clients will not be able to obtain the most updated service locations from the directory. Existing directory services do not assume frequent update and polling from the directory. They assume a relatively static directory structure; hence scalability is a problem when the number of servers and clients are increased. Therefore, the proposed proxy and agent architecture and the Adaptive Service Matching Protocol (ASMP) are designed to adapt to users' needs based on a provided users' profile. Such a profile might include, for a user in an automobile, the planned driving path, and users' interests, which may be based on location and other factors. Additionally the ASMP is configured to deal with a mobile environment using event-based "smart-push" tracking protocol to detect changes in mobile conditions of mobile resources such as change of information sources, change of device's bandwidth, and change of network connectivity. In addition, the ASMP allows service providers or client applications to easily create new services, as needed, to deal with low-bandwidth, long-latency, and unreliable communication channels while moving. This flexibility results from using index-proxies and proxy-service to reference traffic data streams, and, as needed, pre-fetch traffic data streams, to mobile clients, and thereby better support system scalability and resource utilization.

This invention also finds application with dynamic resource composition for content management in a mobile computing environment. In this capacity, the dynamic mobile information service lookup management's objectives include incorporating the mobility profile of mobile resources into the service directory for predicting the near future locations of the mobile resources; hence, reducing the update volume to mobile service directory due to the change in dynamic attributes of mobile resources. Further, the dynamic mobile information service lookup management protocol uses a personal lookup agent to discover and lookup appropriate mobile resources. This lookup is based on the location and anticipated needs of mobile clients in the near future. With such a personal lookup agent, there is mobile code that can be interfaced with different directory services for mobile resources lookup. It can interface with a directory service at base stations of terrestrial cellular networks or the gateways of Geosynchronous Earth Orbit (GEO) satellite network or a Low Earth Orbit (LEO) satellite network. Finally, using event-based "smart push" techniques to monitor and track changing conditions of the mobile resources from mobile information services, the client applications are easily allowed to create new services as they are needed, wherein the new services are based on the mobile client's context or interest. The mobile information services may include vehicular video-camera services, mobile network communication services, and other services.

This invention finds application in vehicular-based information management system, in support of proactive multimedia data and content delivery protocols such as a dynamic overview produced by a cluster of vehicles equipped with video cameras moving in the same direction or real-time traffic-information sharing among mobile users. Compared to the traditional approaches, this protocol would result in better mobile resource utilization and optimization; hence better system scalability.

In general, information services can be classified based on the taxonomy as shown in FIG. 1. In this taxonomy, Information Services 100 are divided into 2 sub-categories primarily based on the data sources at which the contents of the information are produced. The first category is called Dynamic Information Services 102 and the second category is called Static Information Services 104. The category of dynamic information services is further subdivided into two classes based on the contents 106 and the respective network location 108 where the data sources are providing the information contents. If the contents of the information services are sensitive to their surroundings the information services are called "context-sensitive" 110 information services. Similarly, if the contents providing the information services do not vary with context or situation, they are called context-insensitive 112 information services. The context-insensitive information services do not necessarily publish static information. The decision to publish is based, in part, on how the information is acquired or updated. Similarly, the decision to publish dynamic information will depend on the network boundary, or network topology. Further, some dynamic information services are limited by the network topology or network protocols. For those dynamic information services that are not accessible due to network unavailability, the dynamic contents can still be captured locally, provided that local storage is available to store the contents. Conversely, if the information services provide static content, that simply implies context-insensitive information services are provided, but does not suggest that context-sensitive services are not provided. If the static information services are located at different networking domains or different networks, they can be addressed and accessed using different network protocols. When addressing information services or information devices on different networks, the requisite protocol translations are, necessarily, handled by network mobility management. Table 1 shows some examples derived from real world scenarios based on the taxonomy described above.

TABLE 1

| Behavior | Information Sources (Servers) | Information Sinks (Clients) | Examples |
| --- | --- | --- | --- |
| Case 1 | Static | Static | Personal Web Servers (relatively static contents) [Mobile Information Service Directories] Fixed clients (e.g. PCs with static IP address) |
| Case 2 | Static | Dynamic | Personal Web Servers (relatively static contents) [Mobile Information Service Directories] Mobile clients (e.g. Cellular Phone <-> Palm Pilot <-> Notebook <-> wearable computer <-> PDA, etc.) |
| Case 3 | Dynamic | Static | News Web Server (periodical update contents), Stationary Sensors [Mobile Information Service Directories] Fixed clients (e.g. Workstations with static IP address) |
| Case 4 | Dynamic | Dynamic | Vehicle Camera Web Servers, Moving Sensors [Mobile Information Service Directories] Mobile clients (e.g. Cellular Phone <-> |

TABLE 1-continued

| Behavior | Information Sources (Servers) | Information Sinks (Clients) | Examples |
|---|---|---|---|
| | | | Palm Pilot <-> Vehicles with Satellite/Cellular Mobile Internet Access <-> PDA <-> Notebook |

One fundamental problem with mobile computing is that the characteristics of mobile resources and services are dynamically changing in time and location. Agent and client applications must be able to monitor and keep track of such changes in order to provide necessary computation and services to the evolving mobile clients, or servers, to adapt to the ever-changing mobile environment at a particular point in time and at a particular location. The following example, detailed below and in FIG. 2, highlights the application scenarios of such a mobile computing environment in which evolving information services. In this case a vehicular video-based real-time traffic information service is dynamically produced for a first evolving client on the client's behalf. Specifically, other similarly evolving vehicular clients with various computing and display capabilities provide information to the first evolving client. In this scenario an Agent-based Service Broker Architecture and Adaptive Service Matching Protocol (ASMP) are utilized to deal with some of the mobility issues of information or content management in a mobile computing environment.

In the following example, vehicles equipped with GPS receivers and cameras can distribute real-time traffic video as they move on a highway. A client vehicle can request a traffic video feed from one ore more source vehicles ahead of the client vehicle. This traffic video feed provides traffic information to the client vehicle. As vehicles move and change their relative locations, the vehicle camera server that best satisfy the information needs of each client will be changed.

Figure 2:
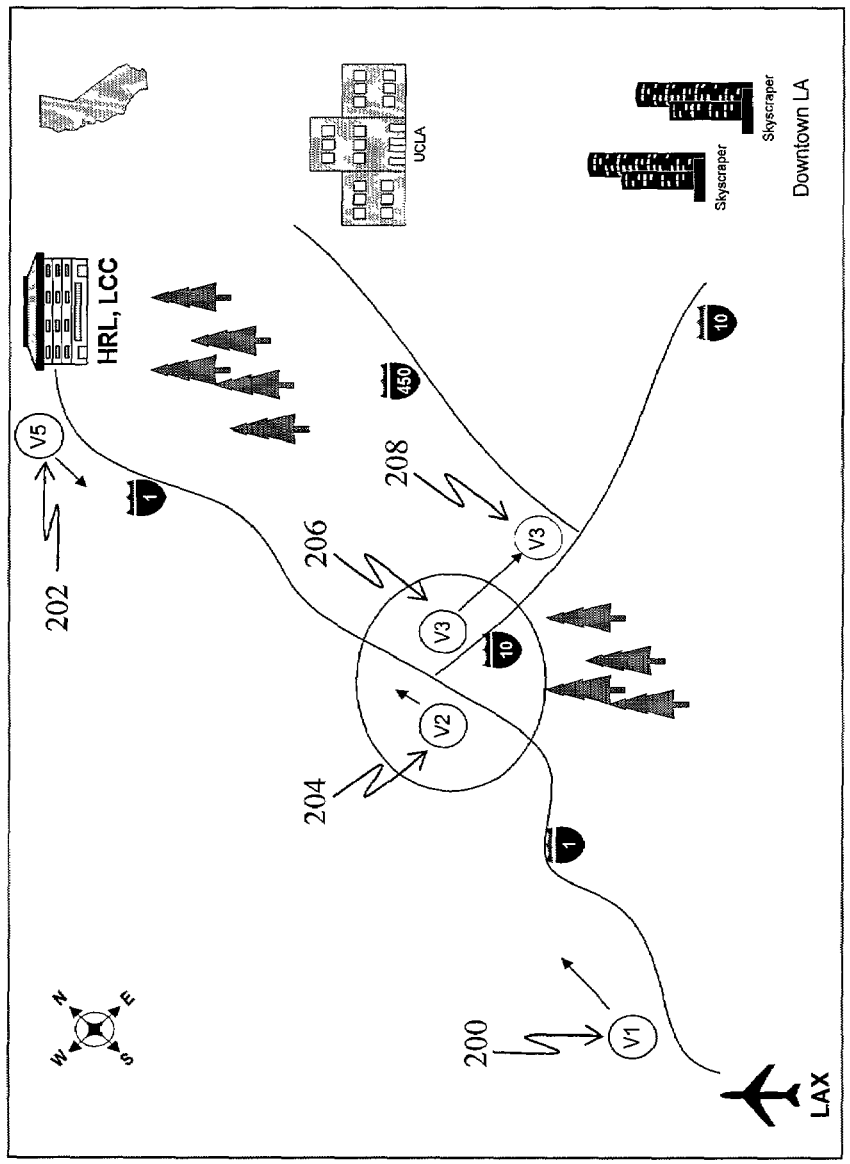
FIG. 2 is schematic illustration of a scenario wherein vehicles request real time traffic information.

In FIG. 2, a first vehicle, Vehicle 1 200 and a second vehicle, Vehicle 5 202 are heading toward a highway junction between Highway 1 and Highway 10. At the same time, Vehicle 2 204 and Vehicle 3 206 are providing video real time traffic information of the Highway junction. Vehicle 1 200 and Vehicle 5 202 can request real-time traffic information from either server Vehicle 2 204 or Vehicle 3 206. However, as Vehicle 3 208 continuously moves towards the east, it will no longer be supporting real-time traffic information of the junction location. Hence, only Vehicle 2 204 would provide relevant traffic information to Vehicle 1 200 and Vehicle 5 202, both of which are continuously heading toward the junction. Therefore, the composition of such evolving information service/client (source/sink) pairs could be changed as evolving sources move into and out of, areas of interest.

Figure 3:
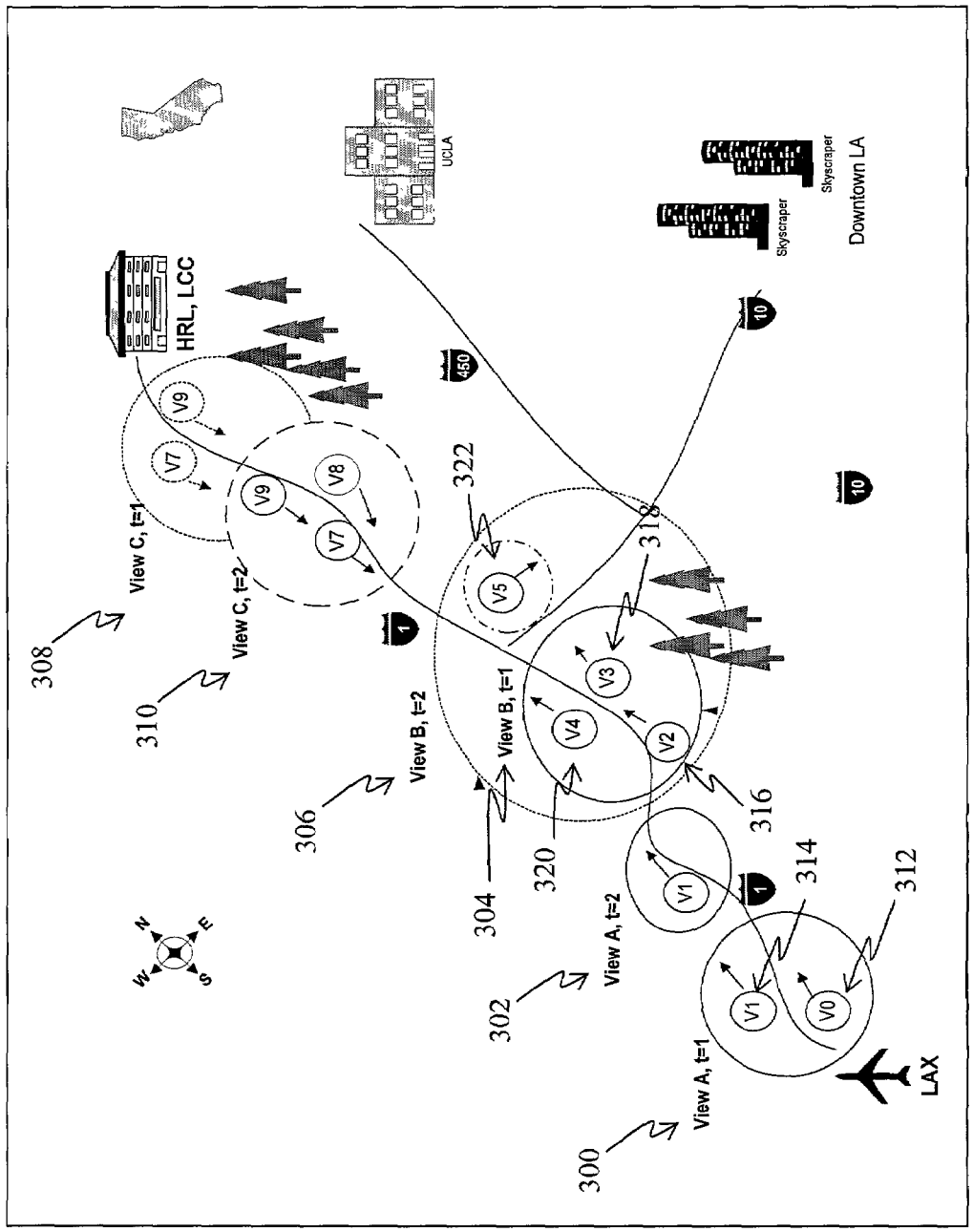
FIG. 3 is schematic illustration depicting a snapshot of vehicular-based video-camera service according to the present invention.

The dynamic composition of the vehicular-based real-time video traffic information service is shown in FIG. 3. In this figure, three views at two separate times are considered. The three views shown are View A at time t=1 300, View A at time t=2 302 View B at time t=1 304 View B at time t=2 306 View C at time t=1 308 View C at time t=2 310. The views set forth above are supported by different clusters of moving vehicles. For example, at time t=1, View B at time t=1 304 is being queried by vehicle 0 312 and vehicle 1 314, and this view is being supported by vehicle 2 316, vehicle 3 318 and vehicle 4 320. As time passes, vehicle 0 312 may leave the area of interest. Only vehicle 1 continues to request video feed of all the vehicles in View B at t=2 306 which is now supported by vehicle 2 316, vehicle 3 318, vehicle 4 320, and vehicle 5 322. This invention provides a scalable information system to manage such dynamic mobile information contents where insertions, updates, deletions, and indexing take place frequently, such that the client's queries are efficiently answered with relevant information.

The matching of clients' service profiles with service descriptions that are advertised to a standard lookup service is limited to exact matches. However, in a mobile computing environment, services such as a vehicular-based real-time video traffic information service will be dynamic and will evolve. The characteristics of each service and client are context-sensitive or location-sensitive. Consequently it is necessary to extend a standard lookup service by adding additional mechanisms to handle dynamic matching of clients and services with changing attributes. The two fundamental issues faced by mobile information service directories are excessive updates of dynamic service entries by mobile information services to the service directory, and excessive polling of the service directory by mobile clients, who are attempting to obtain the most up-to-date service entry descriptions.

Figure 4:
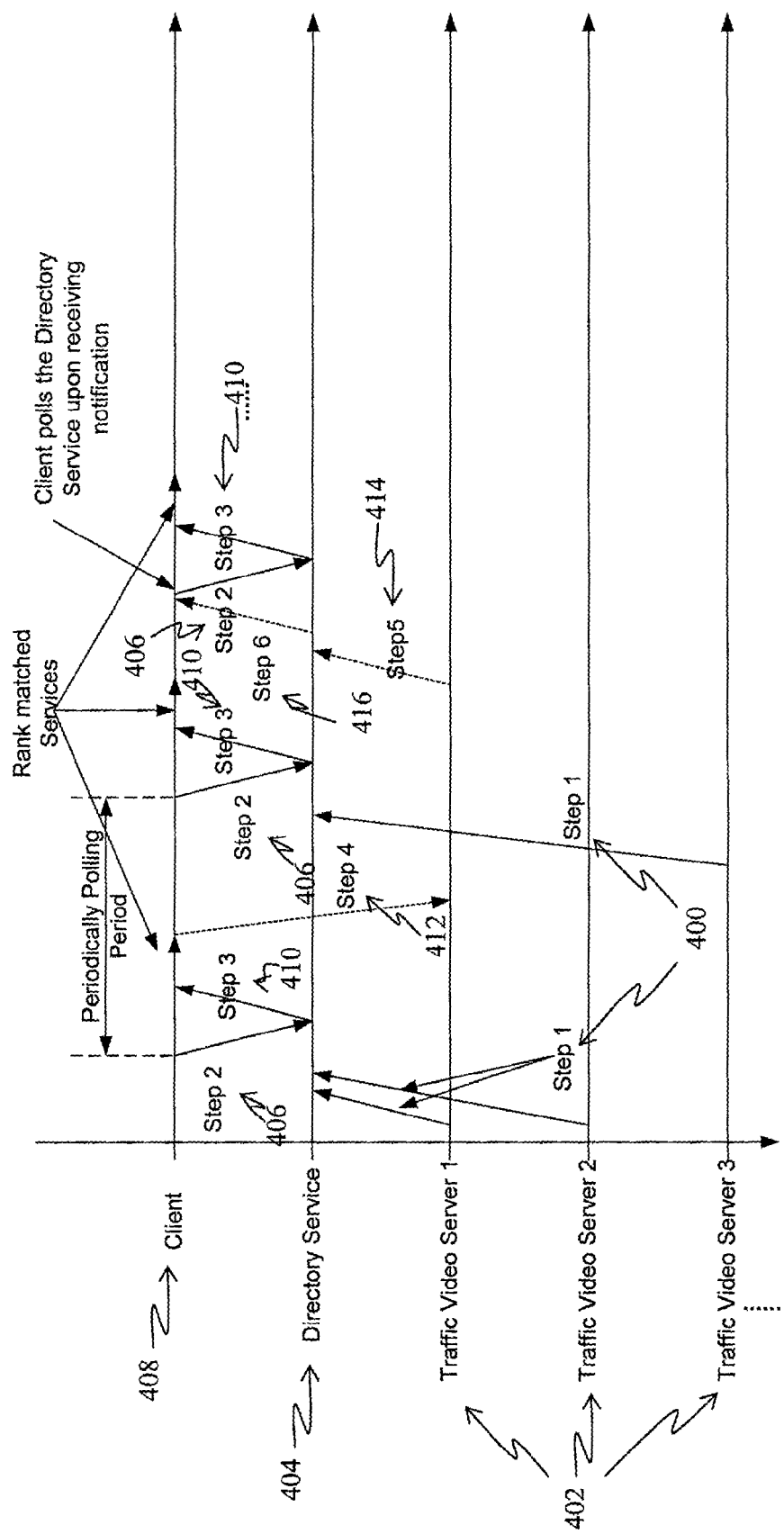
FIG. 4 is graphical illustration depicting how one embodiment of the present invention utilizes a simple protocol for dynamic service directory lookup.

The basic protocol for dynamic service matching as shown in FIG. 4, the lookup protocol consists of the following steps for dynamic service matching:

Step 1 400: Service Registration
    Servers 402 providing service of "traffic video" register their service entries including service name and current GPS location into a directory service 404.

Step 2 406: Request for Service
    Client 408 sends a request periodically to the directory service 404 to lookup all "traffic video" services that may match.

Step 3 410: Matched Services Return to Client 408
    All the matched services of "traffic video" type will be returned to the requesting client 408.
    Client 408 ranks the matched services based on GPS location to select a "traffic video" service that is closest to the client's 408 current GPS location.

Step 4 412: Client's 408 Event-Notification Registration
    Client 408 registers a "service notification" request to the directory service 404 that when the selected "traffic video" service updates its service entry at service directory 404, the registered client will get a notification, which includes the current GPS of such service, from the service directory.

Step 5 414: Service Entry Update
    Traffic video services updates the directory service their new GPS locations.

Step 6 416: Event-Notification by Directory Service 404
    Upon receiving an update from the "traffic video" service, directory service 404 will send "event-notification" to all the registered clients 408 about the new GPS location.

Figure 5:
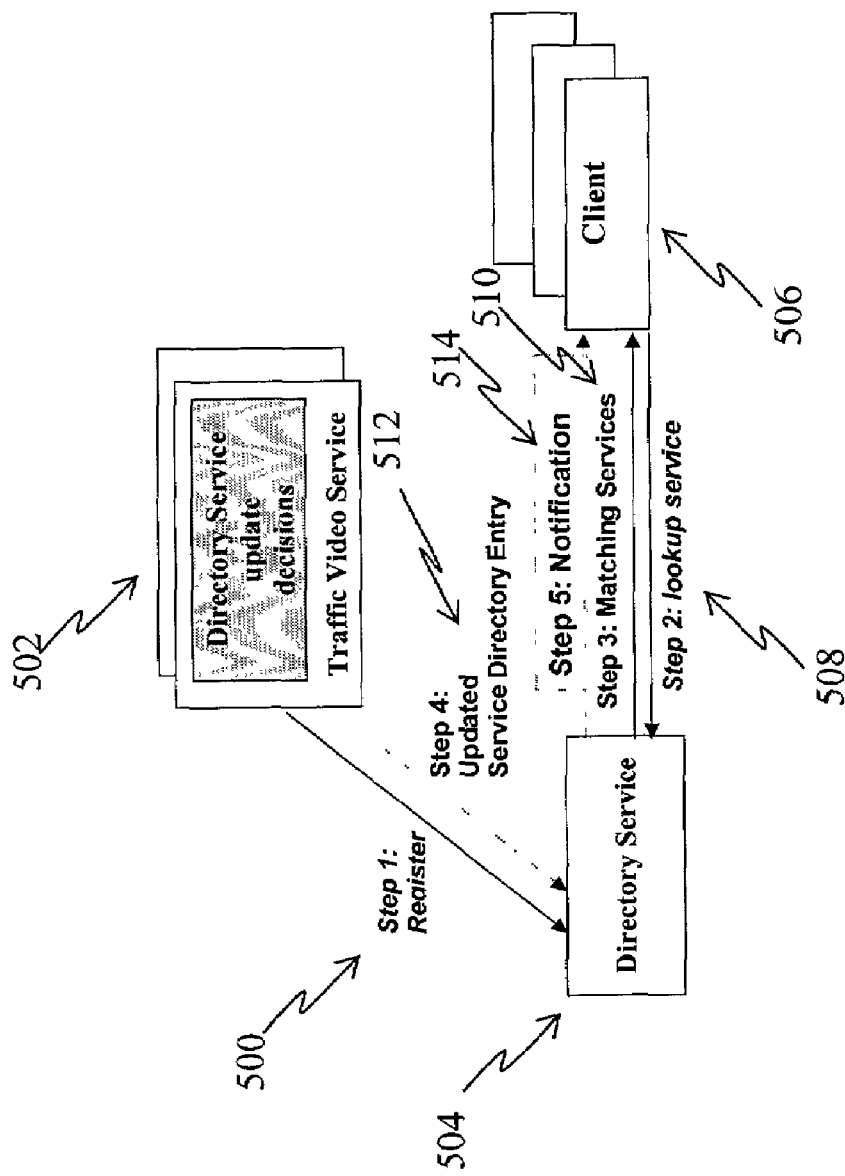
FIG. 5 is a block diagram showing a simple dynamic service lookup according to one embodiment of the present invention.

Some important points of the operation considered in FIG. 4 are represented with greater clarity in FIG. 5 in flowchart form. Step 1 is the registration step 500. The information sources 502, in this example a traffic video service, register with the directory service 504. In step 2 a client 506 queries the directory service 504 with a lookup service 508. The directory service 504 returns matching services 510 in step 3 to the client 506. When the information source 504 has received updated information, it provides an updated service directory entry 512, as depicted in step 4, to the directory service 504. In step 5 the directory service provides notification 514 of the update to the client 506.

When the number of services and clients are large, the protocol of the present invention can lead to the generation of an unnecessarily large load on the network and the client as a result of the indiscriminate polling of the lookup service. This problem is readily overcome in a number of ways. In one particular scenario the protocol only allows the client to monitor a relatively small collection of candidate services for the client. The decision regarding which collection of candidate service to monitor can be based on user context and interest.

Figure 6:
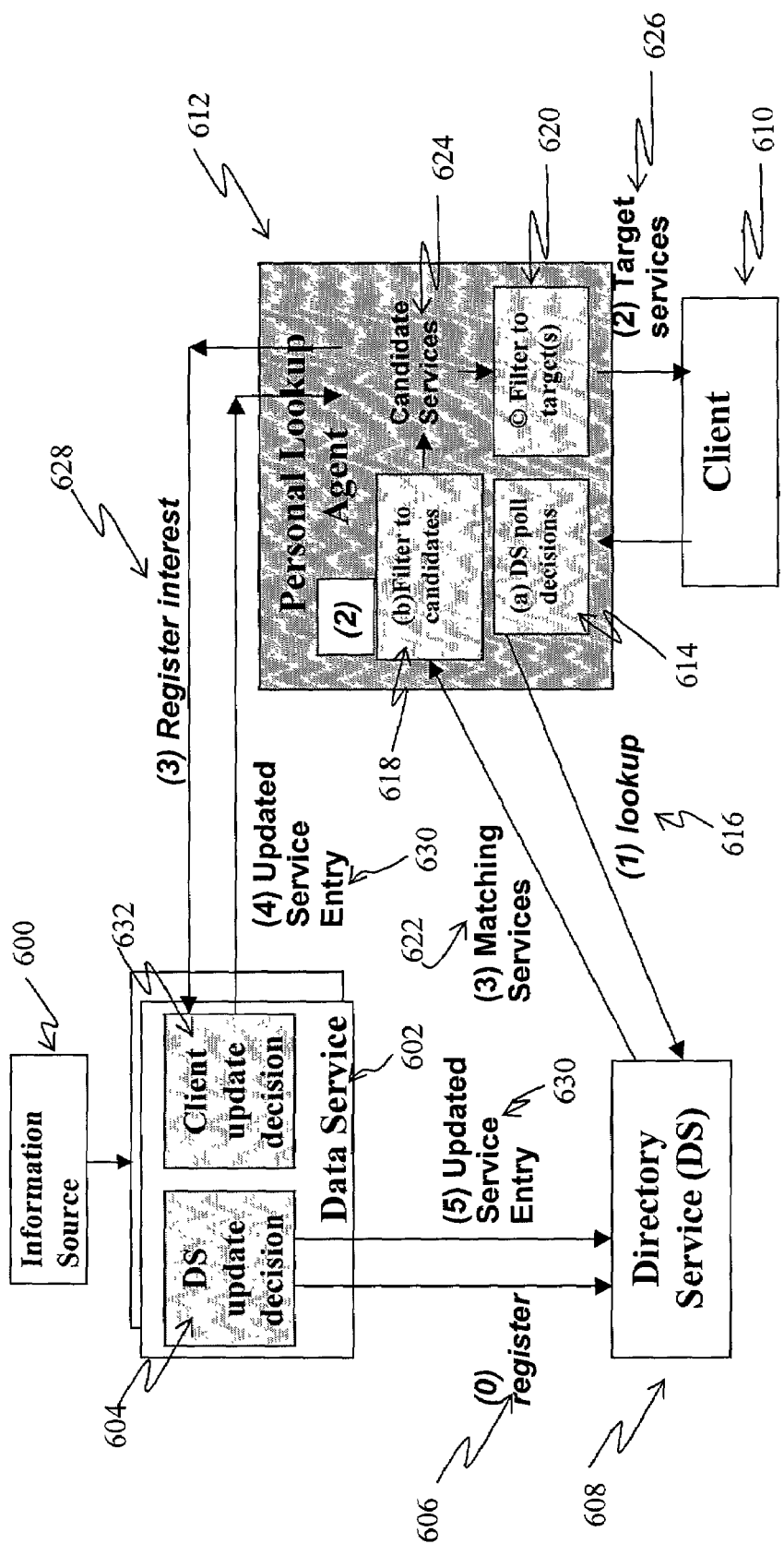
FIG. 6 is a block diagram showing the dynamic mobile service lookup middleware architecture of the present invention.

An important component of the architecture of the present invention is the "personal lookup agent", which is responsible for maintaining a "small" collection of candidate services for the client based on user context and interest. The collection is small as compared to the size of all possible matching services. A flowchart in FIG. 6 illustrates a plurality of the major elements of this invention. The information source element 600 provides information to the data service element 602. The directory service update decision element 604 performs a registration step 606 with the directory service element 608. The client 610 provides a request to the personal lookup agent 612. The directory service poll decisions element 614 queries the directory service element 608 with a lookup step 616 request. The personal lookup agent 612 implements an interface to the directory service element 608 that allows the client 610 to ingest application-specific objects that encapsulate control functions for directory service polling decisions element 614, for a candidate service filtering step 618, and the target service filtering step 620. The directory service 608 returns matching services 622 to the personal lookup agent 612. The candidate services 624 are subjected to an additional filtering step for the purpose of isolating target services. This additional filtering step occurs at the target service-filtering step 620. The resulting target services 626 are delivered to the client.

The personal lookup agent 612 can register interest with the data service 602. Updated service entries 630 are provided back to the personal lookup agent 612 based on the registered interest 628. The directory service update decision element 604 provides an updated service entry 630 to the directory service 608 to enable the directory service to find matching services.

On the service side, there is a notification interface that accepts registration from interested clients 610 and encapsulates the client update decision in the client update decision step 632. Each client 610, can negotiate for bandwidth, which dictates the frequency or condition at which attribute changes are updated to the client 610. This is known as client inaccuracy tolerance. A low inaccuracy tolerance requires a higher update rate and vice versa. The data service element 602 also implements a separate directory service update decision module 604 that controls the update of attribute changes to the directory lookup service 608. The separation of the control functions from the client application allows clients 610 with limited computing resources, to work well with the present invention, because the computing device does not need to handle the complete set of candidate services 624 which are returned from the directory service element 608.

The personal lookup agent includes a piece of mobile code that can be run on different service directories. For example, a personal lookup agent can be injected into the directory services of a terrestrial cellular phone network or the directory services of a satellite network in which such personal lookup agent can be moved or replicated from one base station or gateway to the another.

A dead-reckoning mechanism may also be utilized. Using time and location data provided by a GPS system as a reference, and a mobile server's predicted GPS locations for the future GPS time and location points, a directory service, and mobile clients can predict the next GPS location of the mobile information services. A distance is defined the difference between the actual GPS location at time T=t and the directory services expected location at T=t. If the distance is greater than directory service inaccuracy tolerance D, than the directory service is updated. If the distance is greater than client inaccuracy tolerance then the client is updated. If the current GPS locations of mobile information servers excessively deviate from the directory service's expected GPS locations of the mobile information servers, then the mobile information servers invoke a request to the directory service for updating their current GPS locations.

As the attributes of services in the candidate set of clients are updated, the client can dynamically select the best service to use. Simultaneously, camera services, or other data sources, update the service directory with updated locations for new clients, and the clients still poll the service directory to which all data sources register for newly appearing services, albeit with a much lower frequency. This lower frequency can be adjusted to reflect ambient conditions or certain types of data. The directory service is now responsible for providing information to clients to filter out a "roughly-matching" candidate set. This approach can significantly decrease the number of location update and service directory polling request messages, without changing the level of accepted tolerance for inaccuracy in the service location. When implemented, this approach, allows a service to update its attribute changes to the service directory with less frequency than it updates clients, who have explicitly registered an interest. The tradeoff of this implementation is a decrease in the client polling frequency, and a corresponding delay in time before clients discover clients' new services.

Figure 7:
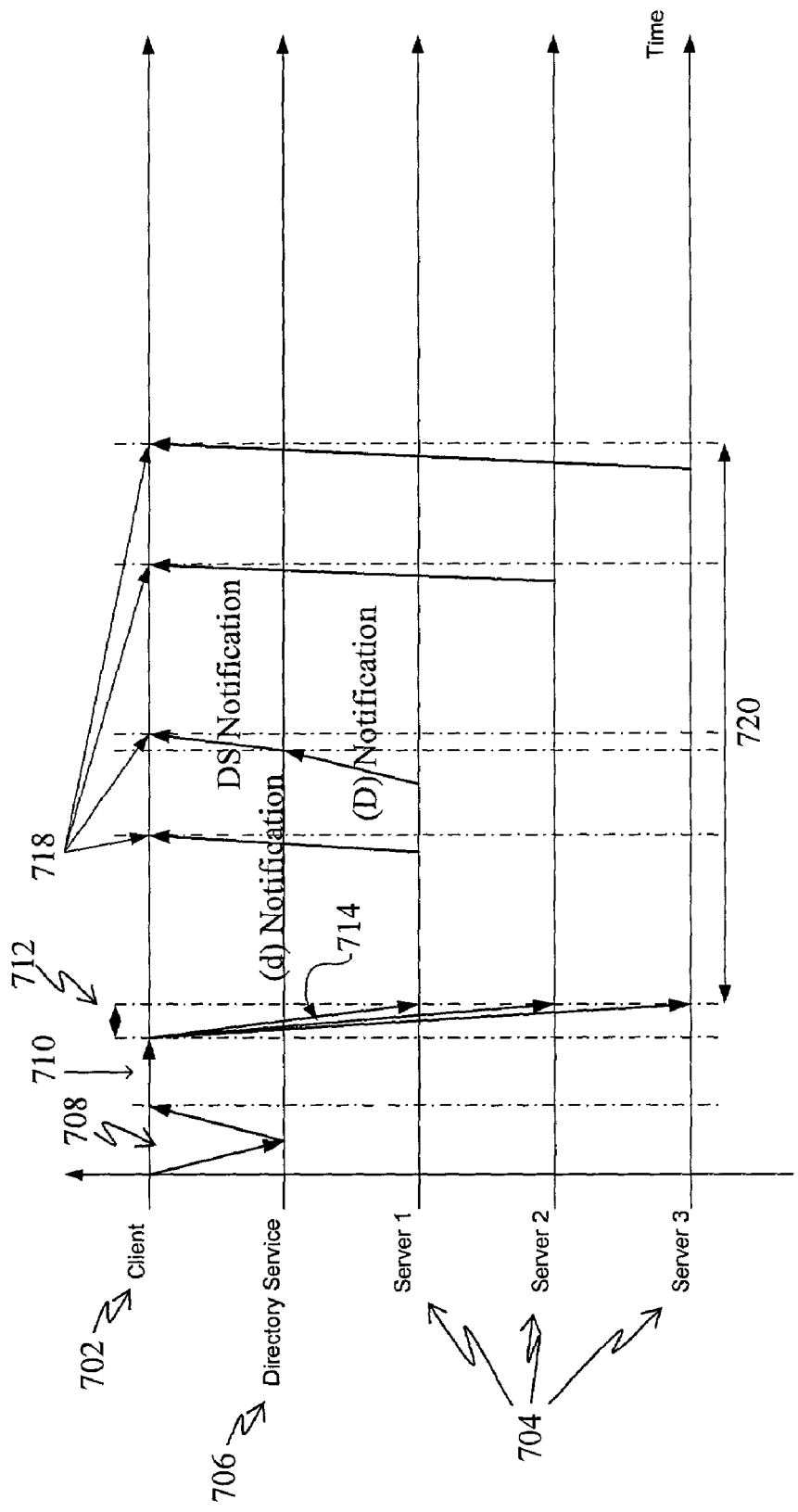
FIG. 7 is a graphical representation showing the coordination/communication interactions according to the ASMP protocol for dynamic mobile service lookup and matching of the present invention.

The Adaptive Service Matching Protocol (ASMP) is detailed in FIG. 7, which illustrates the coordination and communications between clients 702, server(s) 704 and the directory service 706 as depicted in the ASMP protocol for dynamic mobile service lookup and matching. As used herein the server 704 is also the information source. The ASMP protocol is outlined below. The protocol steps will generally be carried out using an apparatus configured to perform steps as detailed below. Such an apparatus could be a hardwired circuit component such an ASIC, a general-purpose computer, running software, or an apparatus embodying a mixture of the above properties.

The ASMP protocol is composed of the following general steps or phases. First is the service discovery phase 708, wherein the primary objective is to make a directory service 706 lookup decision. In this phase the clients 702 must discover available directory service(s) 706 that exist in the network and connect to the discovered available directory service(s) 706. The objective is to locate information services, which are specified in the user's profile, and if no directory service(s) 706 are found, then the client 702 either exits or re-runs the protocol until a directory service 706 is found. When matched services are located, the matched services are returned to the client 702.

Second is the service composition and planning phase 710. In this phase, clients 702 use application logic and user's constraints to select a set of candidate information services or servers 704. The candidate information services servers 704 may include information sources that are expected to be relevant in the near future. In this embodiment the ASMP composes a sequence of candidate information services from the servers 704 suitable sequential consumption. For example, based on user's driving profile (i.e. projected GPS locations of the driving path, $Path_{GPS}$, and current GPS location of client's vehicle ($C_{GPS}$), clients 702 could select a subset of video-camera services that are within a radius of 2 miles from the vehicle's current location, and produce the candidate information service sets. It is possible for the clients' filter candidate service to set and obtain target list sets. The size of the target list sets and the selection criteria are specified by user's profile and can be dynamically adjusted. The target list sets are ranked according to the user's profile. The output of this phase is a list of cascaded matched service and proxy service templates or target service list sets. The order of the list defines the precedence relationship in usage among those identified video-camera services for consecutive consumption.

The third phase is the tracking registration and tear-down phase 712. After obtaining the target list from the service composition and planning phase, clients 702 register event notification callbacks with the target service providers, in this case servers 704 which, in this example instruct the target service providers to send remote-event notifications to the directory service element and track the client's 702 new GPS position relative to servers 704, based on certain predetermined conditions or events.

The first such predetermined condition or event is the notification of the directory service element 706. Upon notification, if the difference in distance between the actual GPS location, and the directory service element's 706 expectations for the GPS location of the server 704 is greater than the directory service's element 706 inaccuracy tolerance threshold as defined in user's profile, then the target service provider sends remote-event notifications to the directory service element 706. These remote-event notifications then update the target service provider's new GPS location.

The second predetermined condition or event is the notification of the clients. If the difference in the distance between the actual GPS location and the directory service's 706 expected GPS location of the target service provider or server 704 is greater than the client's 702 inaccuracy tolerance threshold, as defined in user's profile, then the target service provider 704 would send remote-event notification to update the client of the target service provider's 704 new GPS location 718.

Therefore, each server 704 maintains a list of actual clients and tracking clients. Upon notification of the directory service, the server 704 notifies clients 702 and the directory service 706 of its new GPS location. Similarly, each client 702 maintains a list of anticipated target service providers for consecutive consumption. For each client 702, the entries of the target service providers 704 in the target list will be purged if the current GPS location and projected GPS locations of such service providers are no longer able to support client's 702 context or interests in the near future. If such deletion is required, the teardown of the tracking callbacks must be performed. Additionally, in the tracking, registration, and teardown phases, the following optimization parameters are inputted 714. These include the client inaccuracy tolerance threshold (d), and the directory service tolerance threshold (D).

The fourth phase is the service provisioning, execution, and run-time optimization phase 720. After setting up the tracking notification, client applications (agents) enter into the service provisioning, execution, and run-time optimization phase 720. The objective of this phase is to ensure the continuation of service to clients 702. Upon receiving notification from the information service providers or network protocol servers 704, client applications may decide if a switch of service providers or other adaptation is required. The next possible service provider could be randomly chosen within the target list obtained in phase two. The frequency of switching service provider depends on the Quality of Service (QoS) metric specified in user's profile. Finally, agents may need to re-run ASMP to ensure the target list will not be exhausted. Table 2 describes the different functions that the client 702 and the service providers perform.

TABLE 2

Client 702 does the following:

(1) polls the directory service 706 to look up all services that potentially may match the client's 702 interests;
(2) filters the potentially matching services to a smaller set of candidate information services 704;
(3) register a callback for an entry change for each candidate information service;
(4) filter the candidate information services to get target services using application logic configured to perform the target filtering;
(5) repeat step (4) when service calls back to notify entry update; and
(6) repeat (1) periodically to update candidate set.

Agents do the following:

(1) register with directory service element 706;
(2) update service entry attribute at client 702 when significant changes occur, or periodically as specified by client; and
(3) update network when significant change occur or periodically as specified by a networking protocol.

Figure 8:
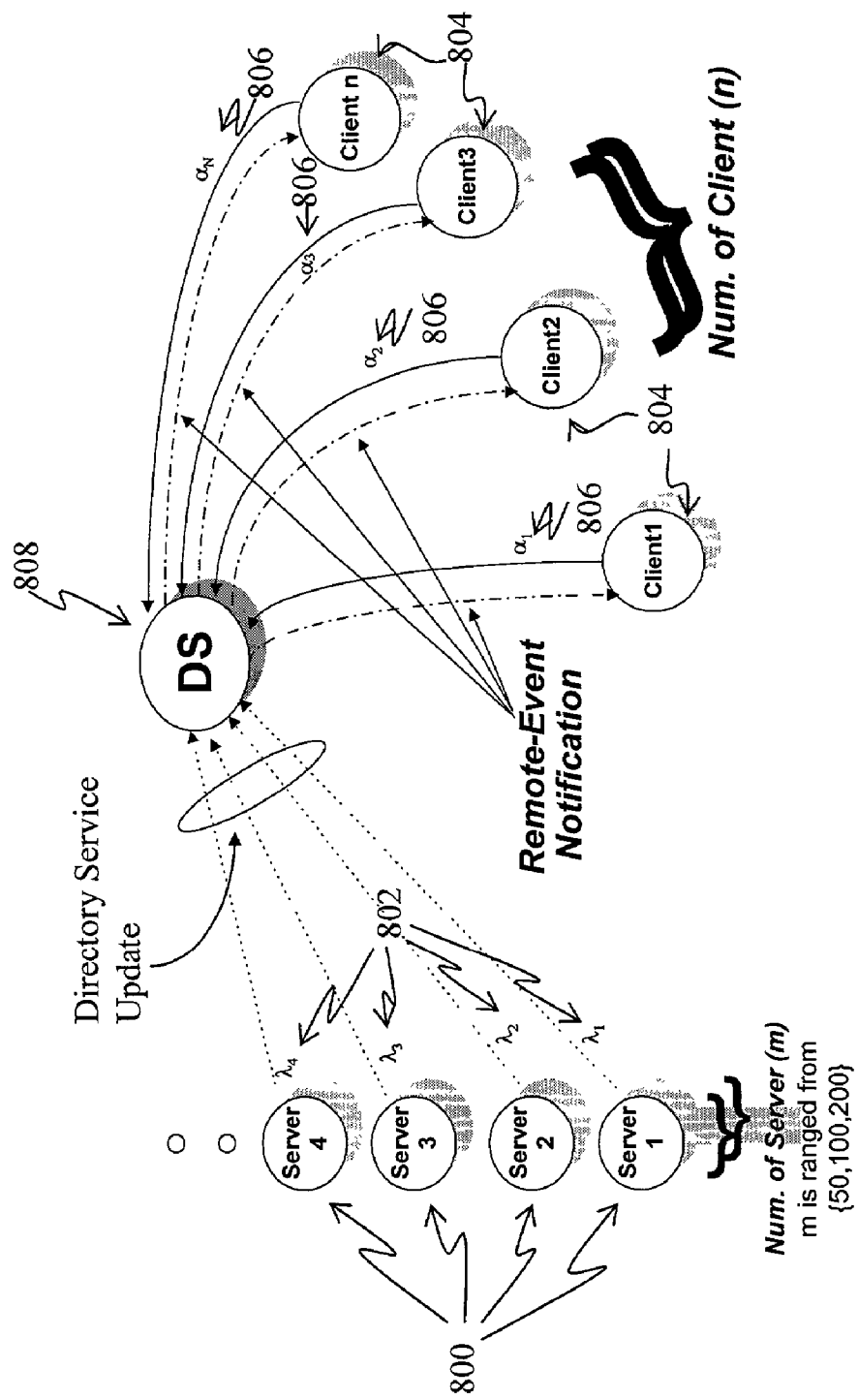
FIG. 8 is a graphical representation of a list of service/proxy service templates according to one embodiment of the present invention.
Figure 9:
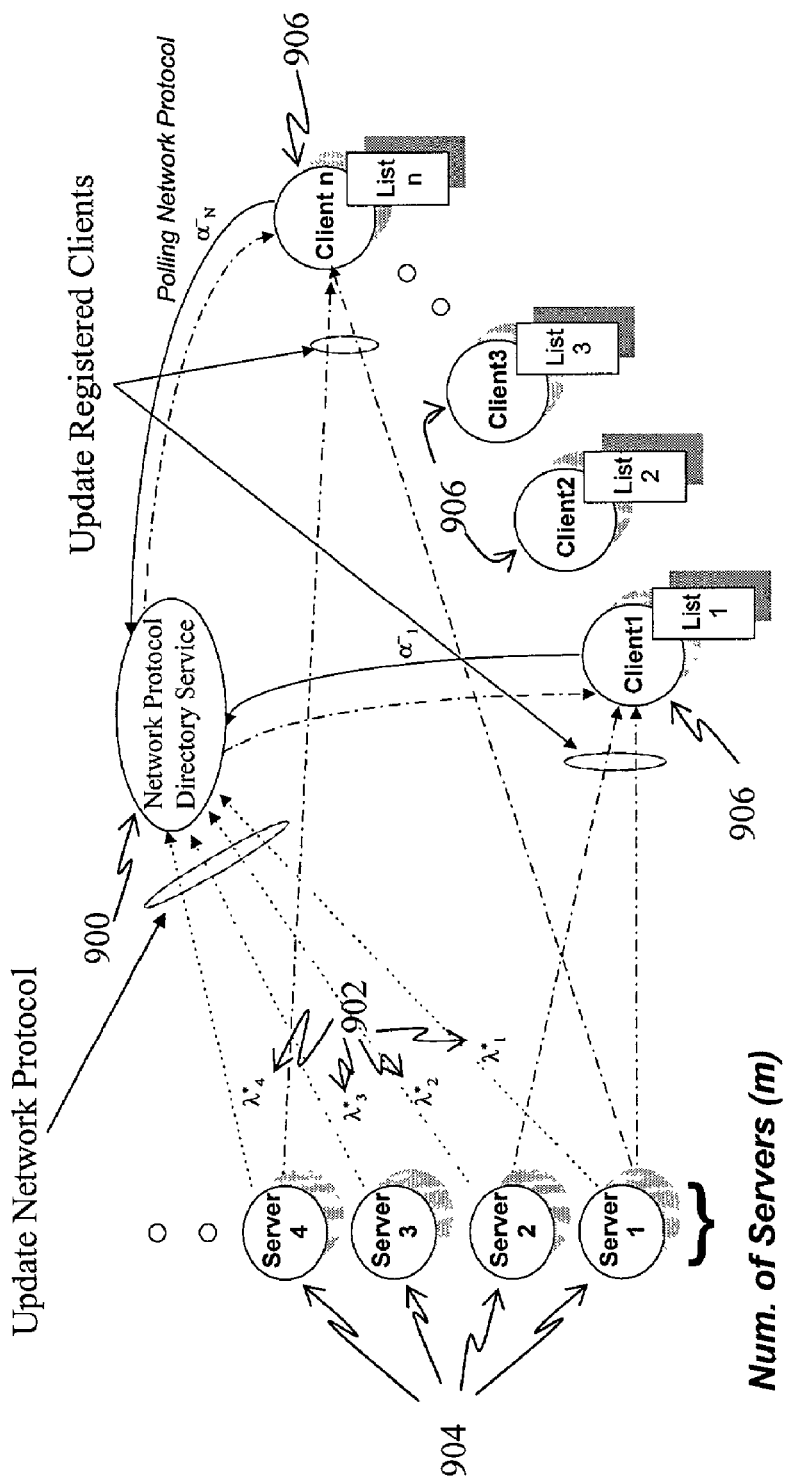
FIG. 9 is a graphical representation of a simple mobile service lookup scenario of the present invention.

A naïve mobile lookup service and the ASMP mobile lookup service are compared in FIG. 8 and FIG. 9. The naïve mobile lookup service is first considered in FIG. 8 and the ASMP mobile lookup service is considered in FIG. 9.

Assume that mobile server i 800 has an average update rate step of $\lambda_i$ 802 and mobile client j 804 has an average polling rate of $\alpha_j$, 806 at a given time. Further, assume that the service policy, of the directory service element 808, for update and polling requests are based on a First In First Served (FIFS) basis. For a given time, the total update arrival rate of the directory service 808, due to updates invoked by mobile servers 800, is given by equation 1.

$$\lambda_1 + \lambda_2 + \ldots + \lambda_i + \ldots + \lambda_m = \sum_{i=1}^{m} \lambda_i, \quad (1)$$

where m is the average number of mobile servers that submit an update request to the directory service 808 at that time.

Similarly, the total polling arrival rate of the directory service 808 due to mobile clients' 804 polling requests is given by equation 2:

$$\alpha_1 + \alpha_2 + \ldots + \alpha_j + \ldots + \alpha_n = \sum_{j=1}^{n} \alpha_j, \quad (2)$$

where n is the average number of mobile clients 804 submitting polling requests to the directory service 808 at that time, and where m is the average number of servers 800 providing directory service 808 at that time. Equation (1) and Equation (2) represent the total number of update requests per second that the directory service 808 observed. It can be shown that if the arrival rates of the update and polling requests of the average service directory customer are lower than that of naïve mobile lookup service, then the ASMP mobile lookup service is better than the naïve method for the same level of service rate, provided by the directory service 808 for update and polling types of customers.

An ASMP mobile service lookup service scenario is detailed in FIG. 9. In the ASMP mobile lookup service, the update and polling arrival rates of the directory service 900 due to mobile servers 904 depends on the DS inaccuracy tolerance threshold D and client inaccuracy tolerance threshold d. If the inaccuracy tolerance threshold D of the directory service 900 for a mobile server 904 is high, the update rate $\lambda^*_i$ 902 of the mobile server 904 to the directory service 900 would decrease. On the other hand, if the inaccuracy tolerance threshold of the directory service 900 for a mobile server 904 were low, the corresponding update rate $\lambda^*_i$ 902 would increase. If the client's inaccuracy tolerance threshold d is low, the update and notification rate of the mobile servers 904 to their registered mobile clients 906 increases. Since mobile clients 906 have cached y services or proxy services, the cache-miss ratio is directly proportional to the number of updates and notifications received from those cached mobile servers 904. As the update and notification rate of cached mobile servers 904 increases, the cache-miss ratio would also be increased correspondingly. Nevertheless, as the cache-miss ratio increases, the polling arrival rate of the directory service (DS) element 900 also increases. Thus, this provides the contents of Table 3.

TABLE 3

Update to Directory Service 900 by Mobile Server 904:

| | |
|---|---|
| DS update rate $\alpha \frac{1}{\Delta D}$ where $\Delta D$ is the DS inaccuracy tolerance threshold | (i) |
| Number of update request message $\alpha$ Update DS rate | (ii) |

Polling to DS by Mobile Client 906:

| | |
|---|---|
| Polling rate $\alpha$ cache-miss rate | (iii) |
| Cache-miss rate $\alpha$ Client update/notification from Mobile server 904 | (iv) |
| Cache-miss rate $\alpha^{-1}$ number of service/proxy services cached (y) | (v) |
| Client update rate $\alpha \frac{1}{\Delta d}$ where $\Delta d$ is the client inaccuracy tolerance threshold | (vi) |
| Number of update/notification message to clients' $\alpha$ update/notification | (vii) |

Since data source element has two types of requests, namely update and polling, in the case of ASMP, by using dead reckoning mechanism, the total update arrival rate of the directory service 900 has been reduced to $$\lambda_1^* + \lambda_2^* + \ldots + \lambda_i^* + \ldots + \lambda_m^* = \sum_{i=1}^{m} \lambda_i^* \text{ where } \lambda_i^* <= \lambda_i \text{ for all } i \quad (3)$$

$\lambda^*_i$ is the update rate of the mobile server to the directory service for the ASMP mobile lookup service;

$\lambda_i$ is the update rate of the mobile server to the directory service for a naïve mobile lookup service; and i increments from 1 to m where m is the number of servers.

Thus Eqn. (3)$\leq$Eqn. (1)

Of primary interest is how the ASMP mobile lookup service would reduce the polling rate of the directory service 900 from mobile clients 906. Since the performance of ASMP depends on the ratio of $$\frac{\Delta d}{\Delta D},$$

the analysis is divided into the following three cases:

Case 1.

$$\frac{\Delta d}{\Delta D} << 1 \Leftrightarrow \Delta D >> \Delta d \rightarrow DS$$

update rate<<Client update rate $\Delta D$ is the change in the directory service element inaccuracy tolerance threshold;

$\Delta d$ is the change in the client's inaccuracy tolerance threshold d; and

DS is the directory service element.

Note that the majority of the service requests received by the directory service (DS) 900 are polling from mobile clients 906. Consequently, the directory service (DS) element update portion of workload by mobile servers 904 can be ignored.

By using items iii, iv, v, vi, vii from Table 3, if the mobile clients 906 maintain a good cache-miss rate, the overall polling rate of the directory service 900, will be reduced. i.e.

$$\alpha_1^- + \alpha_2^- + \ldots + \alpha_j^- + \ldots + \alpha_n^- = \sum_{j=1}^{n} \alpha_j^- \text{ where } \alpha_j^- \leq \alpha_j \text{ for all } j \quad (4)$$

$\alpha^-$ is the client polling request in the naïve mobile lookup service;

$\alpha$ is the client polling request in the ASMP mobile service lookup service; and j increments from 1 to n where n is the number of clients.

Thus Eqn. (4)$\leq$Eqn. (2)

The larger the server-to-client ratio the better cache-miss rate. This is because mobile clients 906 have more mobile servers to choose from, and the cache-miss rate is inversely proportional to the size of the cached mobile servers and proxy servers 904. Thus, case 1 of ASMP should be good for having large number of mobile servers 904 such as vehicle sensors including vehicle-based video-camera services.

Therefore, from case 1, the ASMP is consistently better than naïve mobile lookup 110 service.

Case 2:

$$\frac{\Delta d}{\Delta D} = 1 \Leftrightarrow \Delta D = \Delta d \rightarrow DS$$

update rate Client update rate, $\Delta D$ is the change in the directory service element inaccuracy tolerance threshold;

$\Delta d$ is the change in the client's inaccuracy tolerance threshold d; and

DS is the directory service element.

Consequently, whenever there is an update to the Data Service element from a mobile server 904, there will also be an update from mobile server 904 to its registered mobile clients 906. As for the update arrival rate of the directory service 900, it is the same as depicted in equation (3). Similar to case 1, depending on the cache-miss rate, the lower the cache-miss rates the lower the polling rate. In this case, the extra-overhead is the update notification cost from mobile servers 904 to mobile clients 906. If the number of mobile servers 904 increases, the bandwidth that is necessarily to transmit service descriptions increases. By reducing the polling rate of the directory service 900, case 2 results in a reduction of unnecessary transmission of service descriptions from the directory service element 900 to mobile clients 906. Thus, the case 2 of ASMP is still better than the naïve mobile lookup service.

Case 3:

$$\frac{\Delta d}{\Delta D} >> 1 \Leftrightarrow \Delta D << \Delta d \rightarrow DS$$

update rate>>Client update rate

ΔD is the change in the directory service element inaccuracy tolerance threshold;

Δd is the change in the client's inaccuracy tolerance threshold d; and

DS is the directory service element.

In essence, this case is equivalent to the naïve mobile lookup service because there is no tracking of mobile servers 904 and mobile clients 906 reply on periodic polling or notification from directory service 900 to initiate a polling request to the directory service 900.

What is claimed is:

1. An apparatus for providing context sensitive dynamic data via wireless networks comprising:
    an information source element configured to provide data to a data service element which uses the provided data to register with a directory service element; and wherein a client subsequently requests a service from a directory service polling subelement, which sends a lookup query to the directory service which, in turn provides services matching those requested by the client, to a candidate service filtering subelement, where candidate services are isolated, and are submitted to a target service filtering subelement; where target services are isolated and provided to the client and the isolated candidate services serve as the basis for registering the client's interest with a client update decision subelement and the client update decision subelement provides an updated service entry of candidate services to the target service filtering subelement and the directory service update decision subelement provides an updated service entry to the directory service.

2. The apparatus for providing context sensitive dynamic data via wireless networks as set forth in claim 1, wherein the information source is at least one of the following:
    i. a permanently mounted video camera,
    ii. a video camera affixed to a vehicle,
    iii. a strategically placed environmental sensor,
    iv. an environmental sensor affixed to a vehicle,
    V. a satellite based position sensor affixed to a vehicle.

3. The apparatus for providing context sensitive dynamic data via wireless networks as set forth in claim 1, wherein the data service element includes at least one element from the list consisting of:
    a computer configured to perform pre-specified functions;
    a device configured to respond to operator instructions; a device configured to respond to external instructions; a device configured to respond to internal system instructions; and
    an application-specific integrated circuit; a preprogrammed logic circuit.

4. The apparatus for providing context sensitive dynamic data via wireless networks as set forth in claim 1, wherein the client is in a mobile vehicle and the information source includes at least one of the following:
    i. a terrestrially mounted temperature sensor;
    ii. a terrestrially mounted video camera;
    iii. a vehicle mounted satellite based position indicator;
    iv. a vehicle mounted video camera.

5. The apparatus for providing context sensitive dynamic data via wireless networks as set forth in claim 1, wherein the client has a mobility pattern consistent with that of a pedestrian, and the information source is a plurality of sources including a vehicle and a stationary sensor.

6. The apparatus for providing context sensitive dynamic data via wireless networks as set forth in claim 1, wherein the updated service entry is periodically updated even in the absence of an existing client, and wherein the data service and the directory service are located in a location remote from the personal lookup agent.

7. The apparatus for providing context sensitive dynamic data via wireless networks as set forth in claim 1, wherein the information source is located in at least one location, and the directory service, data service and personal lookup agent are in at least one other location.

8. The apparatus for providing context sensitive dynamic data via wireless networks as set forth in claim 7, wherein the information source is located in at least one location, and the directory service, data service and personal lookup agent are in at least one other general location and at least two of the elements are physically interconnected and at least two of the parts are interconnected using wireless based technology.

9. The apparatus for providing context sensitive dynamic data via wireless networks as set forth in claim 8, wherein the operative interconnect between the information source and the client, is characterized by at least one wireless link.

10. A method for providing context sensitive dynamic data via wireless networks comprising:
    i. providing an information source element;
    ii. providing a data service element including at least one of the following:
        a. a directory service update decision subelement and a
        b. a client update decision subelement
    iii. providing a directory service;
    iv. providing a personal lookup agent, including at least one of the following subelements:
    v. a directory service polling subelement
    vi. a candidate service filtering subelement;
    vii. a target service filtrating subelement;
    wherein the information source is configured to provide data to the data service element; which is configured to register with the directory service element; and
    wherein a client requests a service from the personal lookup agent's directory service polling subelement which sends a lookup query to the directory service which provides services matching those services requested to the candidate service filtering subelement; and wherein the resulting isolated candidate services are submitted to a target service filtering subelement; and wherein the isolated target services are provided to the client; and wherein the isolated candidate services serve as the basis for registering the client's interest with the client update decision subelement; and wherein the client update decision subelement provides an updated service entry of candidate services to the target service filtering subelement and wherein the directory service update decision subelement provides an updated service entry to the directory service element and wherein the candidate services serve as the basis for the personal lookup agent element's registration of interests with the client update decision subelement which is fed by the information source element.

11. The method for providing context sensitive dynamic data via wireless networks as set forth in claim 10 wherein after the initial service lookup utilizing the directory service element, the client contact with the information source subelement, via the personal lookup agent element is substantially confined to the client update decision subelement.

12. The method for providing context sensitive dynamic data via wireless networks as set forth in claim 10, wherein the information source is configured to provide data to the data service in at least one of the following manners:
  i. utilizing a permanently mounted video camera,
  ii. utilizing a video camera affixed to a vehicle,
  iii. utilizing a strategically placed environmental sensor,
  iv. utilizing an environmental sensor affixed to a vehicle,
  V. utilizing a satellite based position sensor affixed to a vehicle.

13. The method for providing context sensitive dynamic data via wireless networks as set forth in claim 10, wherein the data service element includes utilizing at least one of the following:
  i. a computer configured to perform pre-specified functions
  ii. a device configured to respond to operator instructions;
  iii. a device configured to respond to external instructions;
  iv. a device configured to respond to internal system instructions;
  V. an application-specific integrated circuit;
  vi. a preprogrammed logic circuit.

14. The method for providing context sensitive dynamic data via wireless networks as set forth in claim 10, wherein the client is in a mobile vehicle and the information source utilizes at least one of the following:
  i. a terrestrially mounted temperature sensor;
  ii. a terrestrially mounted video camera;
  iii. a vehicle mounted satellite based position indicator;
  iv. a vehicle mounted video camera.

15. The method for providing context sensitive dynamic data via wireless networks as set forth in claim 10, wherein the client is a pedestrian, and the information source utilizes a plurality of sources including a vehicle and a stationary sensor.

16. The method for providing context sensitive dynamic data via wireless networks as set forth in claim 10, wherein the updated service entry is periodically updated even in the absence of an existing client, and wherein the data service and the directory service are located in a location remote from the personal lookup agent.

17. The method for providing context sensitive dynamic data via wireless networks as set forth in claim 10, utilizing the information source in at least one location, and utilizing the directory service, data service and personal lookup agent in at least one other location.

18. The method for providing context sensitive dynamic data via wireless networks as set forth in claim 17, wherein the information source is utilized in at least one location, and the directory service, data service and personal lookup agent are utilized at least one other general location and at least two of the elements are utilized while physically interconnected and at least two of the elements are utilized while interconnected using wireless based technology.

19. The method for providing context sensitive dynamic data via wireless networks as set forth in claim 18, wherein the operative interconnect between the information source and the client, is characterized by utilizing at least one wireless link.

* * * * *

UNITED STATES PATENT AND TRADEMARK OFFICE
CERTIFICATE OF CORRECTION

PATENT NO.        : 7,483,693 B2                                    Page 1 of 1
APPLICATION NO.   : 09/921296
DATED             : January 27, 2009
INVENTOR(S)       : Kelvin T. Leung, Son Dao and Eddie Shek It is certified that error appears in the above-identified patent and that said Letters Patent is hereby corrected as shown below:

On the Title Page Item (75)

The last name of the first inventor in the published document of this patent was misspelled as LUENG. The correct last name should be LEUNG.

Signed and Sealed this

Fifth Day of May, 2009

JOHN DOLL
*Acting Director of the United States Patent and Trademark Office*